(12) United States Patent
Takahashi et al.

(10) Patent No.: US 7,617,901 B2
(45) Date of Patent: Nov. 17, 2009

(54) VEHICLE FRAME INCLUDING PROTECTIVE CAGE STRUCTURE FOR HOUSING A FUEL PUMP, AND MOTORCYCLE INCORPORATING SAME

(75) Inventors: Atsuhiko Takahashi, Saitama (JP); Dai Harada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 239 days.

(21) Appl. No.: 11/606,348

(22) Filed: Nov. 29, 2006

(65) Prior Publication Data
US 2007/0125585 A1 Jun. 7, 2007

(30) Foreign Application Priority Data
Dec. 1, 2005 (JP) ............... 2005-347607

(51) Int. Cl.
*B62D 61/02* (2006.01)
*B62K 11/02* (2006.01)

(52) U.S. Cl. .............. 180/219; 180/68.5; 180/69.4; 180/229; 123/509

(58) Field of Classification Search ............. 180/219, 180/68.5, 69.4; 123/509
See application file for complete search history.

(56) References Cited
U.S. PATENT DOCUMENTS

| | | | |
|---|---|---|---|
| 4,469,190 A | 9/1984 | Yamaguchi | |
| 4,577,719 A | 3/1986 | Nomura et al. | |
| 5,419,625 A | 5/1995 | Iwase et al. | |
| 6,626,155 B1 * | 9/2003 | Ueda et al. | 123/509 |
| 6,779,620 B2 * | 8/2004 | Taniguchi et al. | 180/219 |
| 6,932,177 B2 * | 8/2005 | Hara et al. | 180/219 |
| 7,040,294 B2 * | 5/2006 | Yagisawa et al. | 123/468 |
| 7,252,170 B2 * | 8/2007 | Miyakozawa et al. | 180/219 |

FOREIGN PATENT DOCUMENTS

| | | |
|---|---|---|
| EP | 0624498 A2 | 11/1994 |
| EP | 1 304 283 B1 | 4/2003 |
| EP | 1531104 A1 | 5/2005 |
| EP | 1679243 A1 | 7/2006 |
| JP | 2004-284473 | 10/2004 |

\* cited by examiner

*Primary Examiner*—Lesley D Morris
*Assistant Examiner*—Marlon A Arce
(74) *Attorney, Agent, or Firm*—Carrier, Blackman & Associates, P.C.; William D. Blackman; Joseph P. Carrier

(57) ABSTRACT

A fuel pump mounting arrangement for a motorcycle is provided in which the fuel pump is mounted to the vehicle body frame and in which the fuel pump is protected from impact without increasing the weight of a pivot plate. In the motorcycle, a main frame extends rearwardly from a head pipe, rear frames extend rearwardly from the main frame, and a central frame structure extends downwardly from the rear frames to form a space within the central frame structure. A pivot plate is mounted on a lower portion of the central frame structure, and a rear swing arm is supported on the pivot plate. In such a constitution, a fuel pump is arranged in the space which is formed by the central frame structure.

17 Claims, 6 Drawing Sheets

VEHICLE FRAME INCLUDING PROTECTIVE CAGE STRUCTURE FOR HOUSING A FUEL PUMP, AND MOTORCYCLE INCORPORATING SAME

CROSS-REFERENCE TO RELATED APPLICATIONS

The present invention claims priority under 35 USC 119 based on Japanese patent application No. 2005-347607, filed on Dec. 1, 2005. The subject matter of this priority document is incorporated by reference herein.

BACKGROUND OF THE INVENTION

1. Field of the Invention

The present invention relates to a motorcycle including a vehicle body frame, and particularly to a fuel pump mounted on the vehicle body frame.

2. Description of the Background Art

It is well known for a motorcycle to include a vehicle body frame that includes a head pipe, a main frame, a rear frame and other similar frame components. It is also known to mount a fuel pump on the vehicle body frame. This arrangement of components is disclosed, for example, in FIG. 1 of JP-A-2004-284473. For reference, this figure is reproduced herein as FIG. 6 of the drawings in the present document.

In the previously known design illustrated in FIG. 6, a vehicle body frame 112 for a motorcycle 110 includes a main pipe 128 which extends rearwardly from a head pipe 111, a down pipe 132 which extends obliquely rearwardly and downwardly from the head pipe 111 and, thereafter, extends rearwardly, and a rear wheel suspension portion 133 which connects a rear end of the main pipe 128 and a rear end of the down pipe 132. Further, a fuel pump 127 is arranged inside the rear wheel suspension portion 133.

In this known design, it is possible to protect the fuel pump 127 from an impact which comes from a side of a vehicle body by means of the rear wheel suspension portions 133, because of the location of the fuel pump 127 inside the left and right rear wheel suspension portions 133.

Further, to sufficiently protect the fuel pump 127 from an impact which comes from the side of the vehicle body, for example, it is necessary to increase a strength of the rear wheel suspension portions 133 (hereinafter, also referred to as the pivot plates 133) by increasing a plate thickness of the rear wheel suspension portions 133 or the like. However, a drawback of this arrangement is that the overall weight of the vehicle body is increased when the strength of the rear suspension portions 133 is increased.

It is an object of the present invention to provide a motorcycle which can adequately protect a fuel pump from a side impact collision, without increasing the weight of the pivot plates which form the rear wheel suspension portions.

SUMMARY

A first aspect of an illustrative embodiment of the invention is characterized in that a motorcycle is provided with a vehicle frame including a head pipe, a main frame extending rearwardly from the head pipe, a rear frame extending rearwardly from a rear portion of the main frame, and a central frame structure extending downwardly from the rear frame, at both a front portion and a rear portion of the rear frame, to form a space therebetween. In addition, a pivot plate is mounted on a lower portion of the central frame structure, a rear swing arm is pivotally supported on the pivot plate, and a fuel pump is arranged in the space portion within the frame structure body.

A second aspect of the invention is characterized in that the main frame is arranged proximate a center line in a vehicle width direction, and a fuel tank is arranged such that the fuel tank straddles the main frame. The fuel pump is arranged at the substantially center in the vehicle width direction and, at the same time, a connection portion of a fuel pipe which connects the fuel tank and the fuel pump is arranged on an upper portion of the fuel pump.

A third aspect of the invention is characterized in that an article storage box is arranged on a side of the fuel pump.

In accordance with the first aspect of the invention, the central frame structure is arranged above the pivot plate, and the fuel pump is arranged in the inside of the frame structure body. Hence, it is possible to protect the fuel pump by the frame structure body. Further, it is unnecessary to protect the fuel pump by means of the pivot plate whereby it is possible to avoid an increase in the plate thickness of the pivot plate. As a result, it is possible to protect the fuel pump without increasing the weight of the pivot plate.

In accordance with the second aspect of the invention, the fuel tank is mounted so as to straddle the main frame, which is centrally arranged in the vehicle width direction. Additionally, the fuel pump is arranged substantially centrally in the vehicle width direction and hence, the fuel tank and the fuel pump are both arranged substantially centrally in the vehicle width direction, whereby a distance between the fuel tank and the fuel pump is decreased. As a result, it is possible to minimize a length of the fuel pipe that connects the fuel tank and the fuel pump.

In addition, by arranging the connection portion of the fuel pump and the fuel pipe on an upper portion of the fuel pump, a connection operation of the fuel pipe to the fuel pump can be performed easily and hence, it is possible to easily perform the connection and handling of the fuel pipe.

In accordance with the third aspect of the invention, the article storage box is arranged on the side of the fuel pump, and it is therefore possible to protect the fuel pump by means of the article storage box. As a result, it is possible to further protect the fuel pump against an impact which comes from the side of the vehicle body.

Modes for carrying out the present invention are explained below by reference to an illustrative embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

A selected illustrative embodiment of the best mode of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. In the following description, the symbols R and L refer respectively to the right and left sides of the vehicle, and the symbols F and A refer respectively to the forward and aft sides or directions of the vehicle. In drawings showing a side view of the vehicle, only the viewer's side components are shown, as indicated by symbol L in a left side view and the symbol R in a right side view.

Figure 1:
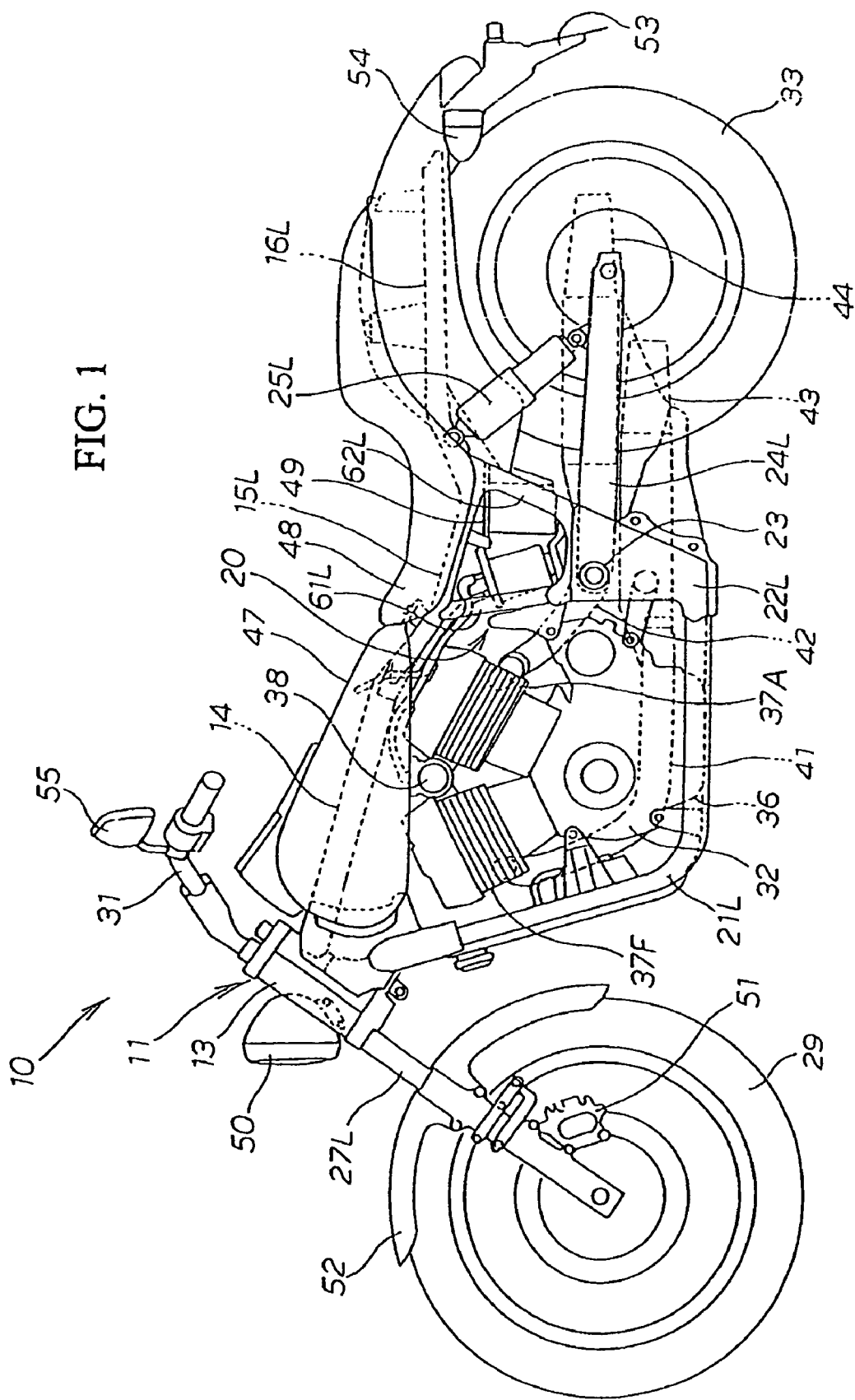
FIG. 1 is a side plan view of a motorcycle according to the present invention, showing the vehicle body frame and the fuel pump mounted within a space formed at a rear portion thereof.

FIG. 1 is a side view of a motorcycle 10 according to a selected illustrative embodiment of the present invention, wherein the motorcycle 10 includes supportive frame assembly, referred to herein as a vehicle body frame 11.

The vehicle body frame 11 includes a head pipe 13, which is mounted on a front end portion of the vehicle, a main frame 14, which extends rearwardly from the head pipe 13, and dual rear frames 15L, 15R which extend rearwardly from a rear end portion of the main frame 14. The vehicle body frame 11 also includes seat rails 16L, 16R, which extend rearwardly from rear end portions of the rear frames 15L, 15R to support a seat 48 thereon, and a central frame cage 20, which includes portions which extend downwardly from each of the front and rear ends of the rear frames 15L, 15R.

The vehicle body frame further includes down frames 21L, 21R, which extend obliquely downwardly from the head pipe 13, pivot plates 22L, 22R which are mounted on rear ends of the down frames 21L, 21R and a lower end portion of the central frame cage 20, and a pivot shaft 23 which is rotatably mounted between the pivot plates 22L, 22R. Rear swing arms 24L, 24R are pivotally mounted to the pivot plates 22L, 22R by way of the pivot shaft 23 so as to be movable in a reciprocally swingable manner, and rear shock absorbers 25L, 25R extend between and connect the rear swing arms 24L, 24R and the seat rails 16L, 16R.

The central frame cage 20 is explained below in further detail, in conjunction with other drawings.

Further, in the motorcycle 10, front forks 27L, 27R are steerably mounted on the head pipe 13, a front wheel 29 is rotatably mounted on lower ends of the front forks 27L, 27R, a steering handle 31 is mounted on upper portions of the front forks 27L, 27R, an engine 32 is arranged in a space surrounded by the main frame 14 and the down frames 21L, 21R, and a rear wheel 33 is rotatably mounted on rear ends of the rear swing arms 24L, 24R.

The engine 32, in the depicted embodiment, is a V-type two-cylinder engine which includes a crank case 36, two cylinders 37F, 37A which are mounted on the crank case 36 in an upwardly extending manner to define a V shape, and a fuel supply device 38 which supplies fuel to the cylinders 37F, 37A.

The exhaust system of the engine 32 is constituted as follows. A first exhaust pipe 41 is connected to the front cylinder 37F which is mounted on the V-type engine, and the first exhaust pipe 41 extends rearwardly. A second exhaust pipe 42 is connected to the rear (aft) cylinder 37A, a first muffler 43 is connected to a rear portion of the first exhaust pipe 41, and a second muffler 44 is connected to a rear portion of the second exhaust pipe 42.

The motorcycle 10 also includes a fuel tank 47, a rider's seat 48, a battery 49, a headlamp 50, a front brake caliper 51, a front fender 52, a rear fender 53, rear turn signal lamps 54L, 54R, and a mirror 55.

Figure 2:
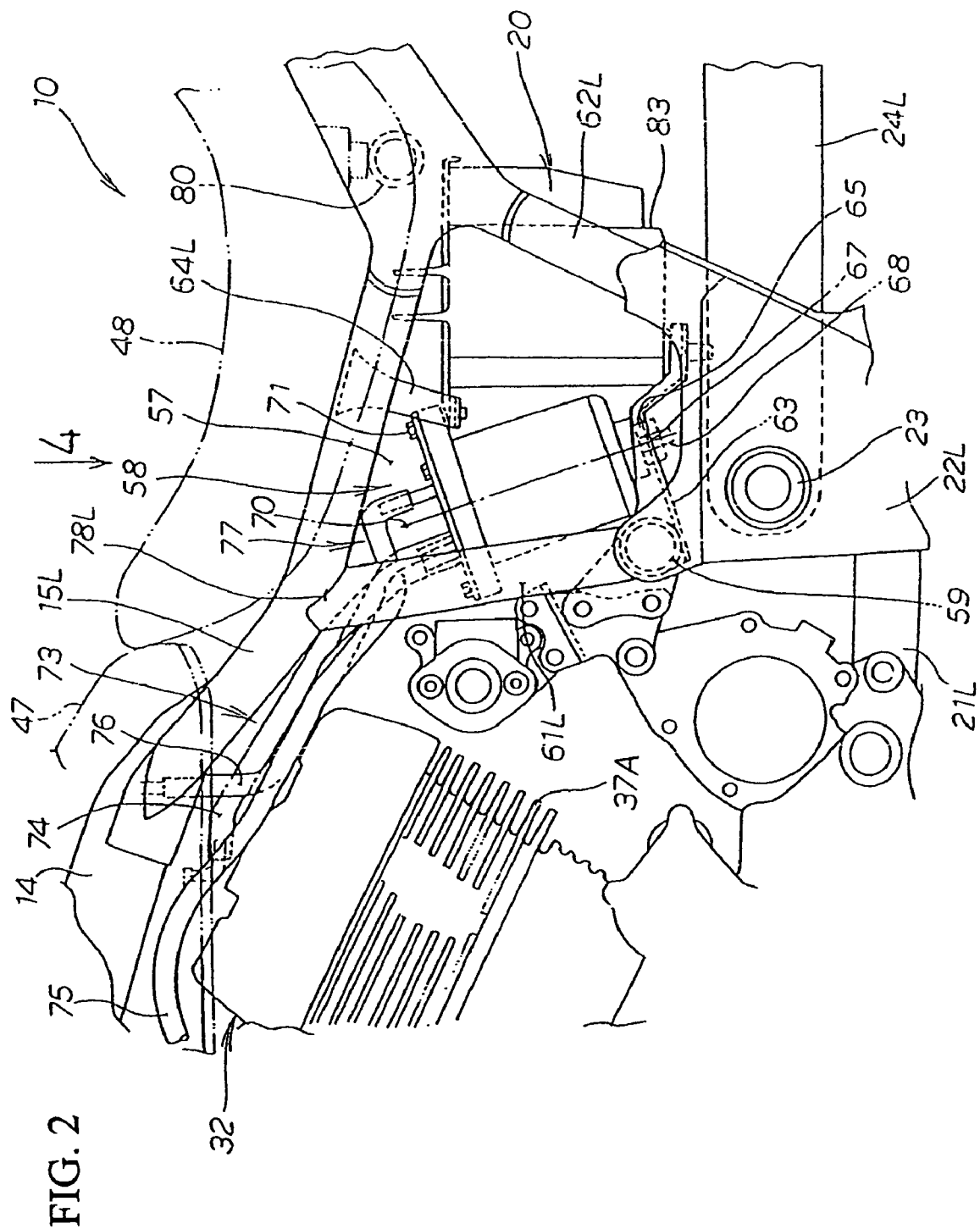
FIG. 2 is an enlarged side plan view of a rear portion of the vehicle body frame of the motorcycle of FIG. 1.

FIG. 2 is a side view of a central part of the motorcycle according to the illustrative embodiment of the present invention. As seen in FIG. 2, the central frame cage 20 includes front center frames 61L, 61R which extend downwardly from front portions of the rear frames 15L, 15R, and rear center frames 62L, 62R extend downwardly from rear portions of the rear frames 15L, 15R.

The pivot plates 22L, 22R are provided at positions where rear ends of the down frames 21L, 21R, lower end portions of the front center frames 61L, 61R and lower end portions of the rear center frames 62L, 62R are arranged. A cross beam 59 is arranged between the left and right front center frames 61L, 61R. Further, a fuel pump 58 is arranged in a protected space 57, which is formed below the rear frames 15L, 15R by the central frame cage 20, such that the length of the protected space 57 is defined by the respective front and rear center frames 61L, 61R, 62L, 62R.

That is, the motorcycle 10 has the following constitution. The main frame 14 extends rearwardly from the head pipe 13 (see FIG. 1), the rear frames 15L, 15R extend rearwardly from the main frame 14, the central frame cage 20 extends downwardly from the rear frames 15L, 15R to form the protected space 57, the pivot plates 22L, 22R are mounted on a lower portion of the central frame cage 20, and the rear swing arms 24L, 24R are pivotally supported on the respective pivot plates 22L, 22R.

In this embodiment, the front center frames 61L, 61R and the rear center frames 62L, 62R of the central frame cage 20 are members which extend downwardly from the rear frame 15. However, it is within the scope of the invention to provide an alternate structure in which the front center frames 61L, 61R extend downwardly from a rear portion of the main frame 14.

The mounting structure of the fuel pump 58 will now be described.

A lower stay 63 extends rearwardly from the cross beam 59, and left and right upper stays 64L, 64R extend downwardly from the rear frames 15 and hence, the fuel pump 58 can be mounted on the lower stay 63 and the upper stays 64L, 64R by way of resilient members 65 (FIG. 2) using fastening members 66, 71, 71.

A cylindrical hole 67 is formed in the lower stay 63, and a shaft member 68 which projects downwardly from the fuel pump 58 is received in the cylindrical hole 67. An axis 70 of the fuel pump 58 is shown in FIG. 2.

A fuel pipe 73 includes a fuel transfer pipe 74 which takes out the fuel from the fuel tank 47 and directs it to the fuel pump 58 where it is pressurized, a feed pipe 75 which directs the pressurized fuel from the fuel pump 58 to the fuel supply device 38 (see FIG. 1), and a return pipe 76 which returns vapor (bubbles) generated by the fuel pump 58 to the fuel tank 47.

The fuel pump 58 is connected to the transfer pipe 74, feed pipe 75, and return pipe 76, via a fuel connection portion 77 at the top of the fuel pump 58, which is arranged in the vicinity of frame connection portions 78L, 78R formed at the respective junctions between the rear frames 15L, 15R and the corresponding front center frames 61L, 61R. It will be understood that the fuel connection portion 77 has inlet and outlet connections thereon for fluidly connecting to the transfer pipe 74, feed pipe 75, and return pipe 76.

In the vicinity of the frame connection portions 78L, 78R, the rear frames 15L, 15R and the front center frames 61L, 61R are arranged close to each other, thus increasing a strength of the frame connection portions 78L, 78R. Accordingly, by arranging the fuel connection portion 77 of the fuel pump 58 in the vicinity of the frame connection portions 78L, 78R, it is possible to effectively protect the fuel connection portion 77 from an impact.

Figure 3:
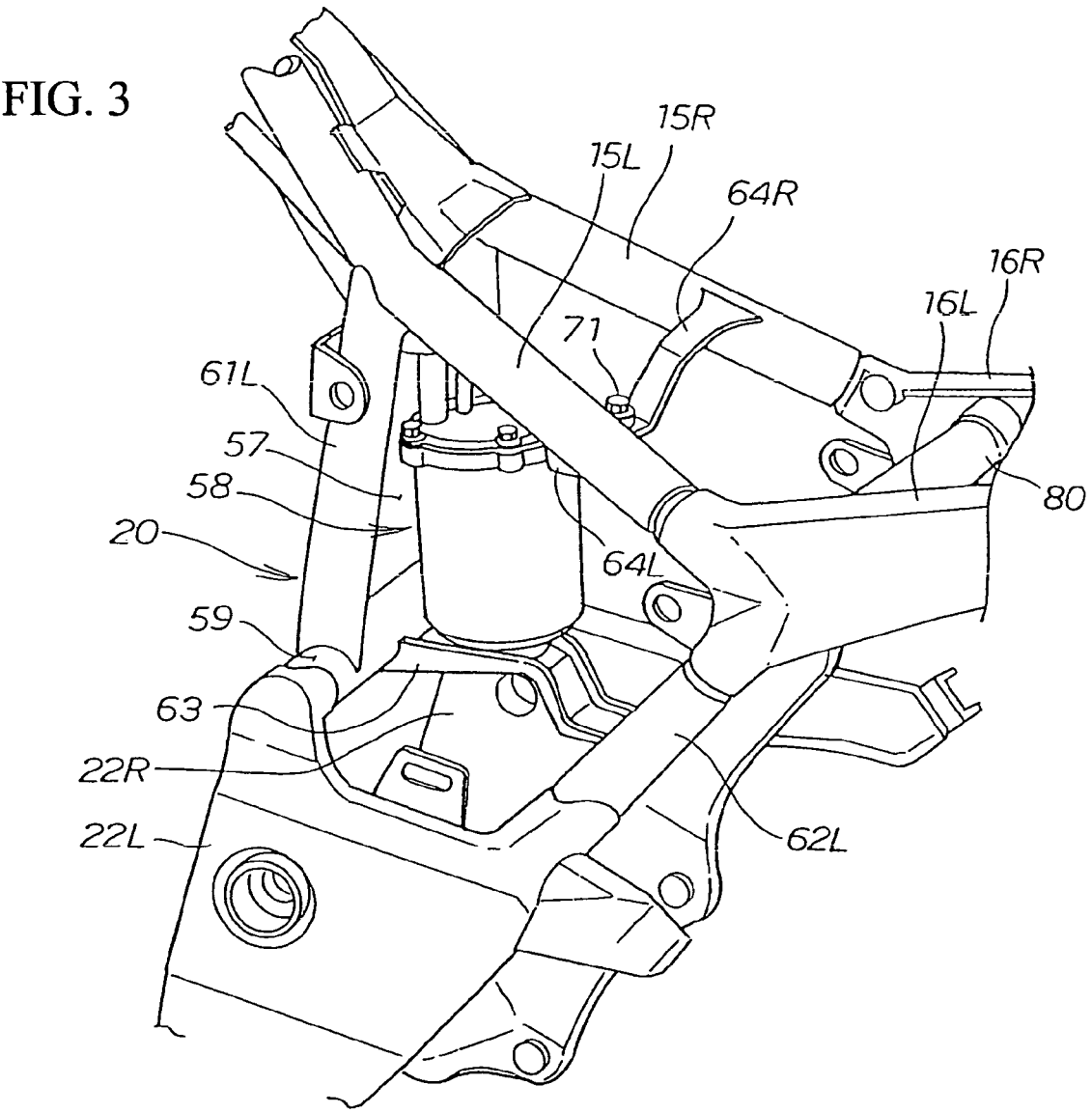
FIG. 3 is a detail perspective view of the vehicle body frame of the motorcycle of FIG. 1 as seen from above and behind the rear portion of the vehicle body frame, showing the mounting structure of the fuel pump which is provided on the motorcycle according to the illustrative embodiment of the present invention.

FIG. 3 is a perspective view showing the mounting structure of a fuel pump which is provided to the motorcycle according to the present invention. By arranging the fuel pump 58 on the lower stay 63 which extends from the cross beam 59, the fuel pump 58 is supported from below. Further, by extending the upper stays 64L, 64R from the rear frames 15L, 15R so as to connect the fuel pump 58 and the rear frames 15L, 15R. Due to such a constitution, the fuel pump 58 is securely held.

Figure 4:
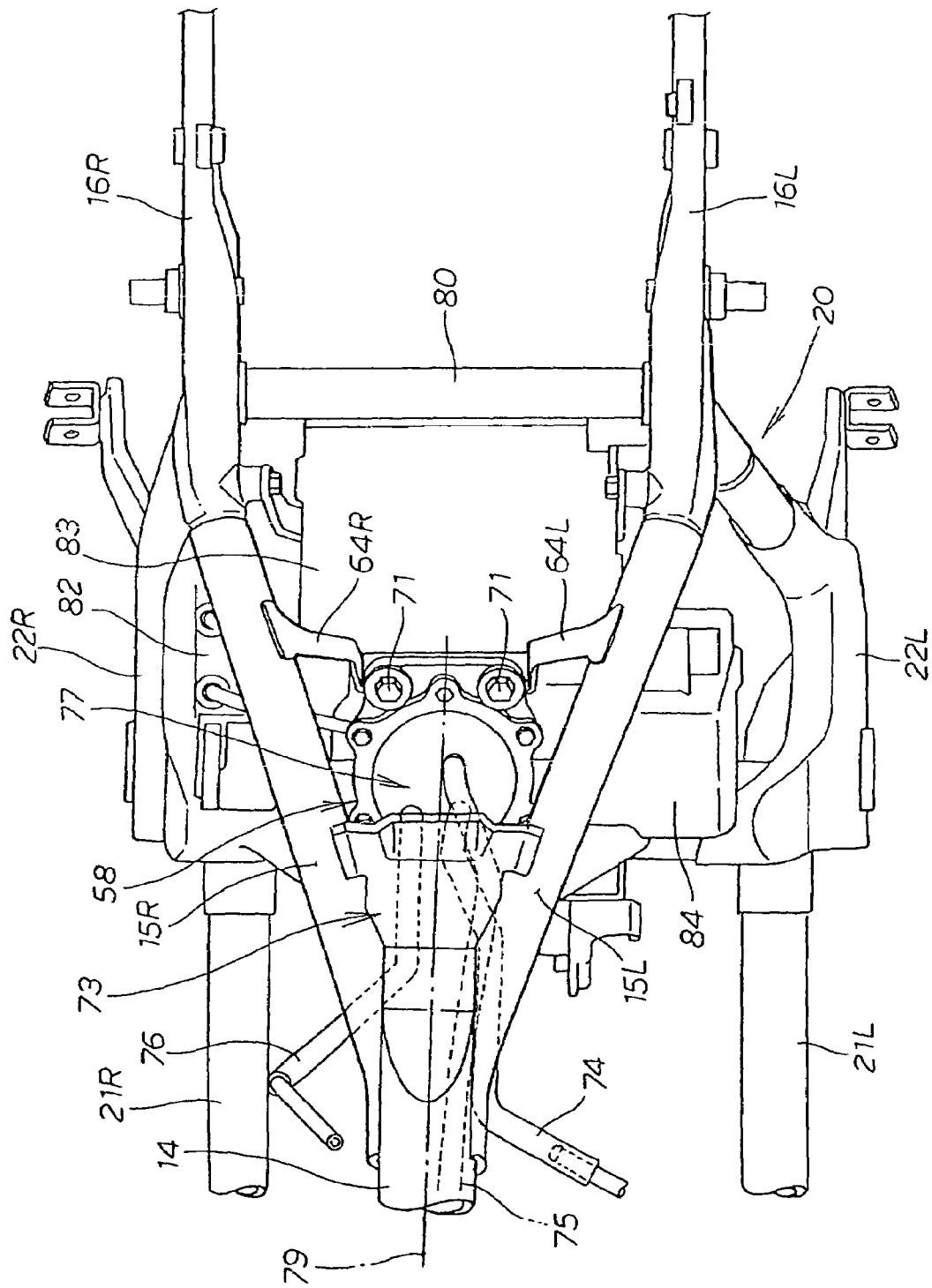
FIG. 4 is a top plan view of the rear portion of the vehicle body frame shown in FIG. 2, as viewed in the direction indicated by an arrow 4 in FIG. 2.

FIG. 4 is a top plan view of the vehicle frame as viewed in the direction indicated by an arrow 4 in FIG. 2. In FIG. 4, the main frame 14 is arranged proximate a center line in the vehicle width direction, the fuel tank 47 (see FIG. 2) is arranged at a position in which it straddles the main frame 14, the fuel pump 58 is arranged at the substantially center in the vehicle width direction and, further, the connection portion 77 of the fuel pipe 73 which connects the fuel tank 47 and the fuel pump 58 is arranged on an upper portion of the fuel pump 58. A rear cross beam 80 extends between the rear portions of the rear frames 15L, 15R adjacent the upper ends of rear center frames 62L, 62R.

The fuel tank 47 (see FIG. 2) is mounted so as to straddle the main frame 14, which is arranged on the center line in the vehicle width direction, and the fuel pump 58 is arranged at the substantially center in the vehicle width direction. Since the fuel tank 47 and the fuel pump 58 are arranged at the substantially center in the vehicle width direction, a distance between the fuel tank 47 and the fuel pump 58 is minimized, and is decreased relative to conventional configurations. As a result, it is possible to shorten a length of the fuel pipe 73 which connects the fuel tank 47 and the fuel pump 58.

In addition, by arranging the connection portion 77 of the fuel pump 58 and the fuel pipe 73 in a location above the fuel pump 58, a connection operation of the fuel pipe 73 is facilitated, thus easing the connection and the handling of the fuel pipe 73. Further, by arranging the connection portion 77 of the fuel pump 58 and the fuel pipe 73 above the fuel pump 58, it is possible to easily perform the connection and the handling of the fuel pipe 73.

The fuel pump 58 has an axially elongated, substantially columnar shape. Further, an axis of the fuel pump 58 is arranged to be directed in a generally vertical direction. Accordingly, it is possible to separate the fuel pump 58 from an outer surface of the vehicle body. As a result, the fuel pump 58 is even less affected by an impact from the side of the vehicle body.

As shown in FIG. 4, an article storage box 84 is arranged on a left side of the fuel pump 58, an inclination sensor 81, a starter magnet 82 and the like are arranged on a right side of the fuel pump 58, and a battery storage box 83 which stores a battery is arranged behind the fuel pump 58.

In addition to the central frame cage 20, the article storage box 84, the starter magnet 82, a fuse box 85 and the like are arranged on respective lateral sides of the fuel pump 58 and hence, it is possible to further enhance the fuel-pump protective performance against an impact which comes from the side of the vehicle body.

Figure 5:
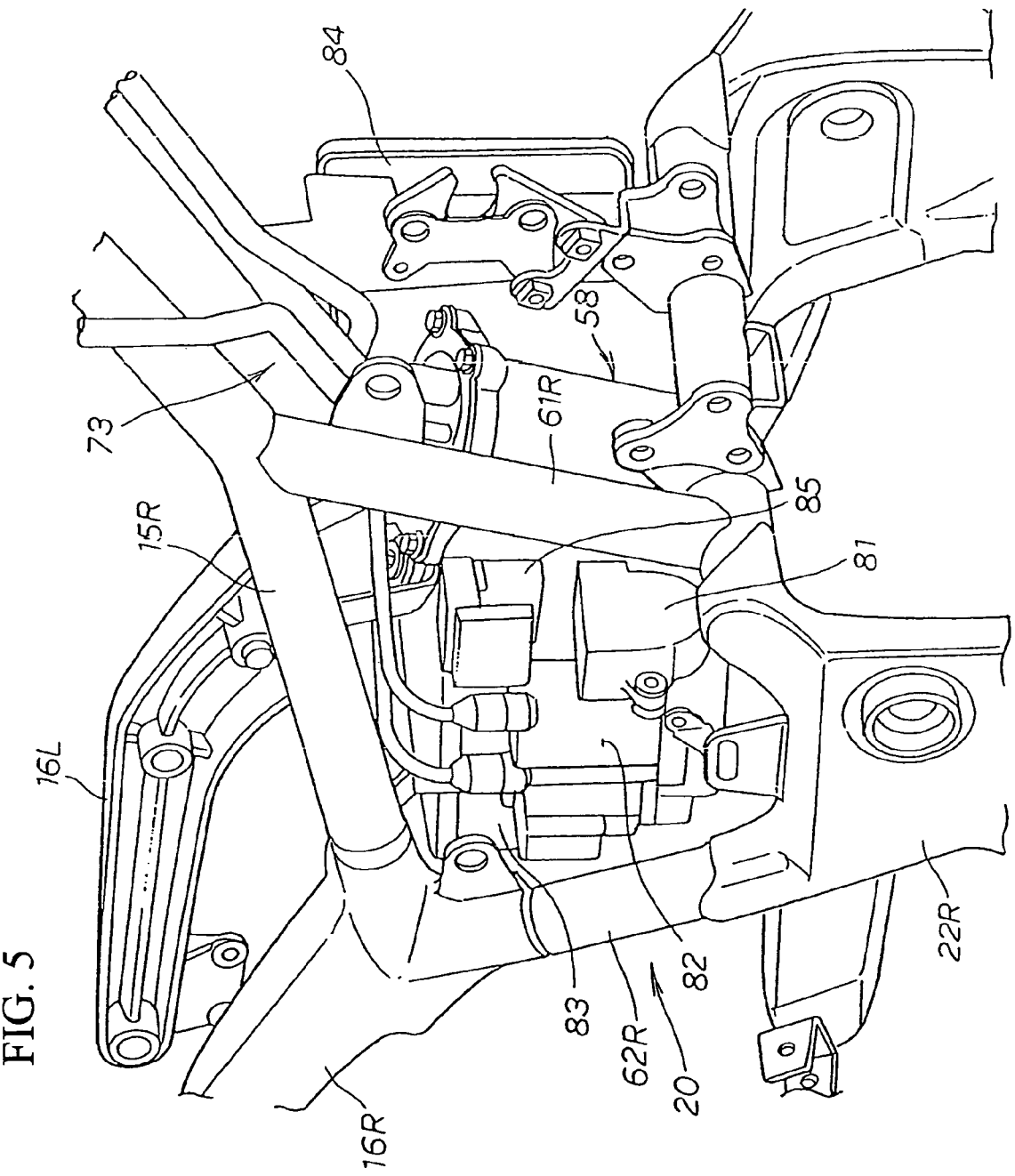
FIG. 5 is a front perspective view of the rear portion of the vehicle body frame shown in FIG. 2, as viewed from a right side of the vehicle showing an arrangement of elements on a side of the fuel pump provided to the motorcycle according to the illustrative embodiment of the present invention.
Figure 6:
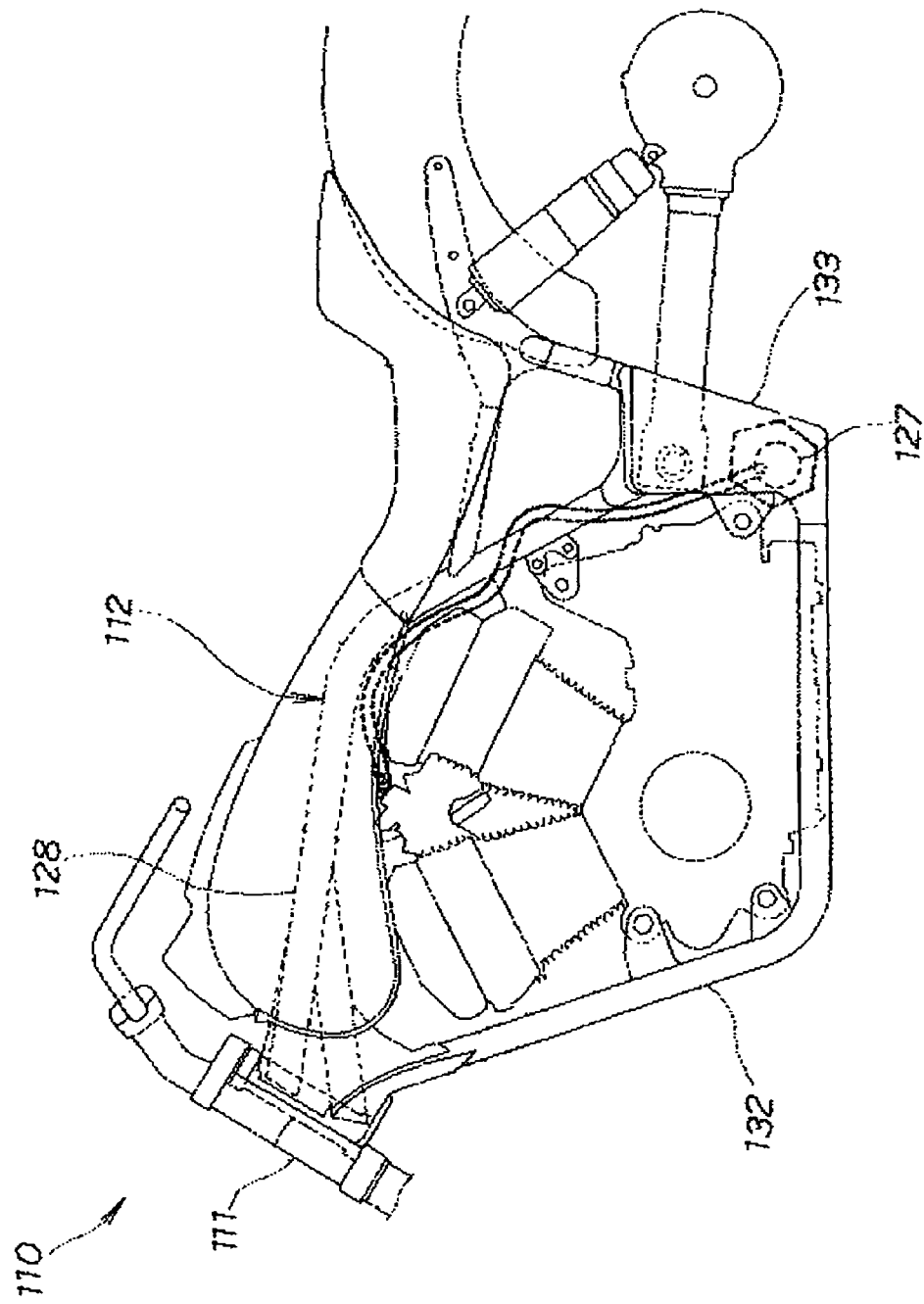
FIG. 6 is a side view of a prior art motorcycle body frame illustrating a conventional arrangement for mounting a fuel pump to the body frame.

FIG. 5 is a right side perspective view of the vehicle frame showing an arrangement of elements on the side of the fuel pump provided to the motorcycle according to the present invention. In FIG. 5, the inclination sensor 81, the starter magnet 82 and the battery storage box 83 are arranged within the central frame cage 20 in a state that the inclination sensor 81, the starter magnet 82 and the battery storage box 83 surround the fuel pump 58. Accordingly, it is possible to protect the fuel pump 58 from an impact which comes from a circumferential direction thereof.

The manner of operation of the motorcycle having the above-mentioned constitution is explained hereinafter.

Returning to FIG. 3, the central frame cage 20 is arranged above the pivot plates 22L, 22R and the fuel pump 58 is arranged within the central frame cage 20 and hence, it is possible to protect the fuel pump 58 by the central frame cage 20. Further, it is unnecessary to protect the fuel pump 58 by the pivot plates 22L, 22R. As a result, it is unnecessary to increase the plate thickness of the pivot plates 22L, 22R. Thus, it is possible to protect the fuel pump 58 without increasing a weight of the pivot plates 22L, 22R.

Here, in this embodiment, the central frame cage 20 includes the front center frames 61L, 61R, which are arranged on left and right sides and extend downwardly, and the rear center frames 62L, 62R, which are arranged on left and right sides and extend downwardly. However, plate-shape members may be used in place of the front center frames and the rear center frames.

While the present invention is suitably applicable to a motorcycle, it will be understood that it could also be applied to scooters or other saddle-type vehicles.

While a working example of the present invention has been described above, the present invention is not limited to the working example described above, but various design alterations may be carried out without departing from the present invention as set forth in the claims.

What is claimed is:

1. A motorcycle, comprising:
   a head pipe;
   a main frame extending rearwardly from the head pipe;
   at least one rear frame extending rearwardly from the main frame;
   a central frame structure extending downwardly from both a front portion and a rear portion of the rear frame and cooperating therewith to define a frame cage having a protected space therein, said central frame structure comprising:
      a front center frame joined to said rear frame at a frame connection portion;
      left and right front center frames;
      a cross beam interconnecting said front center frames; and
      a lower stay which extends rearwardly from the cross beam;
   a pivot plate mounted on a lower portion of the central frame structure; and
   a rear swing arm pivotally supported on the pivot plate,
   wherein a fuel pump is arranged in the protected space within the central frame structure,
   wherein the fuel pump comprises an upper end having inlet and outlet connections thereon, the upper end of said fuel pump situated proximate the frame connection portion of said central frame structure;

and wherein a lower end of said fuel pump is supported on and operatively attached to said lower stay.

2. A motorcycle according to claim 1, wherein
the main frame is arranged proximate a center line in a vehicle width direction, and
a fuel tank is arranged such that the fuel tank straddles the main frame, and wherein the fuel pump
is arranged at the substantially center in the vehicle width direction, and
a fuel connection portion of the fuel pump, at which the fuel pump is connected to at least one external fuel passageway, is arranged on an upper portion of the fuel pump.

3. A motorcycle according to claim 1, wherein an article storage box is arranged on a side of the fuel pump.

4. A motorcycle according to claim 2, wherein an article storage box is arranged on a side of the fuel pump.

5. A motorcycle according to claim 1, wherein the central frame structure comprises a front frame member and a rear frame member, and wherein the fuel pump is disposed intermediate the front frame member and the rear frame member.

6. A motorcycle according to claim 5, wherein the fuel pump is formed with an axially elongated, substantially columnar shape, and is oriented within the space such that a longitudinal axis thereof is substantially vertical.

7. A motorcycle according to claim 1, wherein
said at least one rear frame comprises a left side rear frame and a right side rear frame,
the central frame structure comprises a left side front frame member, a right side front frame member, a left side rear frame member, and a right side rear frame member, and wherein
upper ends of the left and right side front frame members are connected to the front portions of the respective rear frames,
upper ends of the left and right side rear frame members are connected to the rear portions of the respective rear frames, and
lower ends of the left and right side front frame members and the left and right side rear frame members are connected to the pivot plate.

8. A motorcycle according to claim 1, wherein an article storage box is disposed on a lateral side of the fuel pump, and a starter magnet is disposed on an opposed lateral side of the fuel pump.

9. A motorcycle according to claim 1, wherein an article storage box, a starter magnet, and a battery storage box are each arranged side-by-side with the fuel pump such that the article storage box, starter magnet, and battery storage box generally surround the fuel pump, with the battery storage box disposed behind the fuel pump, and the article storage box and starter magnet disposed on opposite sides of the fuel pump.

10. A motorcycle according to claim 1, wherein the pivot plate is disposed below the protected space.

11. A motorcycle, the motorcycle comprising:
a head pipe;
a main frame extending rearwardly from the head pipe;
at least one rear frame extending rearwardly from the main frame;
a central frame structure extending downwardly from both a front portion and a rear portion of the rear frame and cooperating therewith to define a frame cage, said central frame structure comprising a front center frame joined to said rear frame at a frame connection portion;
a pivot plate mounted on a lower portion of the central frame structure; and a rear swing arm supported on the pivot plate, wherein
a protected space is defined within the central frame structure, below the rear frame and above the pivot plate, and
a fuel pump is arranged in the protected space which is formed by the central frame structure,
wherein the fuel pump comprises an upper end having inlet and outlet connections thereon, the upper end of said fuel pump situated proximate the frame connection portion of said central frame structure;
wherein the central frame structure comprises a front frame member and a rear frame member, and wherein the fuel pump is disposed intermediate the front frame member and the rear frame member.

12. A motorcycle according to claim 11, wherein
the main frame is arranged proximate a center line in a vehicle width direction, and
a fuel tank is arranged such that the fuel tank straddles the main frame, and wherein the fuel pump
is situated proximate a center of the motorcycle in the vehicle width direction, and
a fuel connection portion of the fuel pump, at which the fuel pump is connected to at least one external fuel passageway, is arranged on an upper portion of the fuel pump so as to be closely adjacent the frame connection portion of the central frame structure.

13. A motorcycle according to claim 11, wherein an article storage box is arranged side-by-side with the fuel pump.

14. A frame assembly for a saddle-type vehicle, said frame assembly comprising:
a head pipe;
a main frame extending rearwardly from the head pipe;
at least one rear frame extending rearwardly from the main frame;
a central frame structure comprising a front center frame member and a rear center frame member extending respectively downwardly from a front portion and a rear portion of the rear frame and cooperating therewith to define a central frame cage;
a pivot plate mounted on a lower portion of the central frame cage for pivotally supporting a swing arm thereon; and
a rear swing arm supported on the pivot plate, wherein
a protected space is defined within the central frame cage, below the rear frame and above the pivot plate, and
said central frame cage is adapted to protectively receive a fuel pump therein;
wherein the frame cage is configured to receive the fuel pump therein at a location intermediate the front frame member and the rear frame member.

15. The frame assembly of claim 14, wherein an article storage box is arranged on a side of the frame cage.

16. The frame assembly of claim 14, wherein
said at least one rear frame comprises a left side rear frame and a right side rear frame,
the central frame structure comprises a left side front frame member, a right side front frame member, a left side rear frame member, and a right side rear frame member, and wherein
upper ends of the left and right side front frame members are connected to the front portions of the respective rear frames,
upper ends of the left and right side rear frame members are connected to the rear portions of the respective rear frames, and
lower ends of the left and right side front frame members and of the left and right side rear frame members are connected to the pivot plate.

17. The motorcycle of claim 11, wherein the central frame structure comprises:

left and right front center frames;

a cross beam interconnecting said front center frames, and a lower stay which extends rearwardly from the cross beam, wherein a lower end of said fuel pump is supported on and operatively attached to said lower stay.

* * * * *